United States Patent [19]

Sorensen

[11] Patent Number: 4,582,048

[45] Date of Patent: * Apr. 15, 1986

[54] FLOATING BLANKET BARRIER UTILIZING COVERITES

[75] Inventor: Jens O. Sorensen, Rancho Santa Fe, Calif.

[73] Assignee: Soren Christian Sorensen, Rancho Santa Fe, Calif.

[*] Notice: The portion of the term of this patent subsequent to Aug. 28, 2001 has been disclaimed.

[21] Appl. No.: 644,552

[22] Filed: Aug. 27, 1984

Related U.S. Application Data

[63] Continuation-in-part of Ser. No. 469,562, Mar. 2, 1983, Pat. No. 4,467,786, which is a continuation-in-part of Ser. No. 320,484, Nov. 12, 1982, abandoned.

[51] Int. Cl.$^4$ .............................................. F24J 3/02
[52] U.S. Cl. .................................... 126/415; 126/426; 4/499
[58] Field of Search ............... 126/445, 444, 415, 416, 126/400, 426; 4/498, 499

[56] References Cited

U.S. PATENT DOCUMENTS

| 3,453,666 | 1/1969 | Hedges | 4/172 |
| 3,998,204 | 12/1976 | Fuchs et al. | 126/270 |
| 4,091,800 | 5/1978 | Fletcher et al. | 126/415 |
| 4,109,325 | 8/1978 | Shuff | 4/172.12 |
| 4,137,612 | 2/1979 | Kelley | 126/271 |
| 4,146,015 | 3/1979 | Acker | 126/271 |
| 4,241,724 | 12/1980 | Hull | 126/415 |
| 4,380,993 | 4/1983 | Spitzer | 126/415 |
| 4,461,276 | 7/1984 | Yogev et al. | 126/415 |
| 4,467,786 | 8/1984 | Sorensen | 126/415 |
| 4,480,632 | 11/1984 | Klier et al. | 126/415 |

FOREIGN PATENT DOCUMENTS

| 2132213 | 1/1973 | Fed. Rep. of Germany | 4/498 |
| 2139986 | 2/1973 | Fed. Rep. of Germany | |
| 2552559 | 6/1977 | Fed. Rep. of Germany | |
| 3014182 | 10/1981 | Fed. Rep. of Germany | |
| 2316554 | 1/1977 | France | 126/415 |
| 2330971 | 7/1977 | France | 126/415 |
| 8100129 | 1/1981 | PCT Int'l Appl. | |
| 2064097 | 6/1981 | United Kingdom | 126/415 |
| 1597459 | 9/1981 | United Kingdom | 126/415 |

OTHER PUBLICATIONS

Levy and Vofsi, "Transparent Polymeric Gels for Solar Ponds", Polymer Preprints, vol. 23, No. 1, Mar. 1982, pp. 197–198.

Edesess and Fynn, "Salt-Gradient Solar Ponds and Their Liner Requirements", Polymer Preprints, vol. 23, No. 1, Mar. 1982, pp. 199–200.

Euro-Matic Balls Brochure, date unknown.

Primary Examiner—James C. Yeung
Assistant Examiner—Noah P. Kamen
Attorney, Agent, or Firm—Edward W. Callan

[57] ABSTRACT

A barrier for retarding transfer of certain energy and/or substances between adjacent fluids having different densities. The barrier includes a floating blanket consisting of a multitude of individual and distinct coverites that float on a high density fluid, such as water, and separate a low density fluid, such as air, from the high density fluid. Each coverite of the blanket includes a wall of flexible material encasing an enclosed fluid. Each coverite presses against and compresses its neighboring coverites, whereby its flexible wall mutually conforms to the shape of its neighboring coverites' flexible walls to thereby form the floating blanket barrier. The enclosed fluid includes a low density enclosed fluid having a density approximately the same as the first said low density fluid and a high density enclosed fluid having a density approximately the same as the first said high density fluid. Each coverite includes an interior wall for separating the low density enclosed fluid from the high density enclosed fluid. Liquids enclosed in the coverites may contain a substance which decreases convection therein so as to decrease heat loss by such convection. The coverites may be transparent or opaque in accordance with the particular use of the blanket.

15 Claims, 2 Drawing Figures

FLOATING BLANKET BARRIER UTILIZING COVERITES

This is a continuation-in-part application of a pending U.S. patent application Ser. No. 469,562, filed Mar. 2, 1983, now U.S. Pat. No. 4,467,786 which was a continuation-in-part application of patent application Ser. No. 320,484, filed Nov. 12, 1982, now abandoned, both being entitled SOLAR HEATING OF WATER UTILIZING COVERITES.

FIELD OF INVENTION

The invention relates to barriers for retarding the transfer of some energy and/or substances between adjacent fluids having different densities, such as air and a body of water.

DISCUSSION OF PRIOR ART

Heretofore a thin film of oil has been suggested for covering bodies of water in order to reduce evaporation. Unfortunately the oil is very polluting to the environment. For example, birds will get covered by the oil and die, and other organisms will be poisoned. Furthermore, the thin film of oil has very little insulating effect and heat escapes from the body of water to the air by simple heat conduction.

It has also been suggested to cover the surface of the water with a film of plastic, but unfortunately it is very costly to repair the plastic film once it is ruptured and rain water has a tendency to collect on top of the plastic film, giving rise to problems of removing the rain water which, when evaporating, cools the body of water. Such a plastic cover is described in U.S. Pat. No. 4,109,325 to Shuff entitled "Inflatable Swimming Pool Cover System" and in Federal Republic of Germany Patent Application No. 2,132,213 by Krahmer. Shuff describes an inflatable swimming pool cover system in which an inflatable, transparent, thin film plastic pool cover is attached by a peripheral plastic sidewall sheet to a water tube which is filled with water to 80 percent capacity for ballast. Krahmer describes a swimming pool cover including a floatable framework and a sheet attached to the framework for covering and thereby thermally insulating the pool.

Another suggestion has been to cover a body of water with a large number of floatable balls. Such is described in U.S. Pat. No. 3,998,204 to Fuchs et al entitled "Floatable Ball."

Fuchs et al describe a floating blanket made up of a plurality of floatable balls, which are rigid and contoured to have flat side surfaces which engage the flat surfaces of adjacent balls to provide a gapless blanket. The balls are substantially hollow and contain ballast in the bottom so that the balls will float with the flat side surfaces vertically disposed. The top portion of each ball is made of clear plastic and the bottom portion is made of metal-filled black plastic, or metal, the top surface of the bottom portion having a black coating for absorbing radiant energy. The inner space of the balls is filled with air to insulate and protect the liquid covered by the blanket of balls and to prevent such liquid from losing heat by conduction through the balls to the air.

SUMMARY OF THE INVENTION

The present invention provides a barrier which is not polluting to the environment, which insulates a body of water from the air in order to reduce heat loss, which is less costly to repair because it tends to repair itself and which does not collect water on its upper surface.

The present invention is an improved barrier for retarding transfer of certain energy and/or substances between adjacent fluids having different densities. The barrier of the present invention includes a floating blanket consisting of a multitude of individual and distinct coverites that float on a high density fluid, such as water, and separate a low density fluid, such as air, from the high density fluid. (The terms "high" and "low" are used herein only in a comparative context relative to each other and not in an absolute context to characterize any particular type of fluid.) Each coverite of the blanket includes a wall of flexible material encasing an enclosed fluid. Each coverite presses against and compresses its neighboring coverites, whereby its flexible wall mutually conforms to the shape of its neighboring coverites' flexible walls to thereby form the floating blanket.

By way of contrast, the floatable balls of Fuchs et al do not have flexible covers. As a result, they will not mate together with the same degree of compactness as the flexible-cover coverites in the barrier of the present invention. The covers of the floatable balls of Fuchs et al would not conform to the shape of a neighboring object that is not also a hexa-spheroid. Therefore, if a Fuchs et al-type floatable ball should rupture, a hole in the "blanket" would result; whereas a ruptured coverite would be compressed by neighboring coverites and there would not be a resultant hole in the blanket. The coverite blanket of the present invention is self-repairing, as pointed out above.

As pointed out in applicant's U.S. Pat. No. 4,467,786 issued Aug. 28, 1984, when the wall of flexible material and the enclosed fluid of the coverites are transparent to at least a portion of the solar radiation spectrum, the barrier is useful in a system of solar heating a body of water which has its surface exposed to air and radiation from the sun. The heating is achieved by covering the surface of the body of water with a floating blanket consisting of thousands of coverites, whereby the resulting blanket of coverites admits the solar radiation to reach the body of water, reduces heat absorbing evaporation of the body of water to the air, and thermally insulates the body of water from the air.

The floating blanket barrier of the present invention has several uses not necessarily related to solar heating. The barrier may be used to retard the transfer of certain energy and/or substances and to allow the transfer of others. The barrier may also be directional, that is, it may be adapted to retard the transfer in one direction while it allows the transfer in the opposite direction. When, for example, the high density fluid is water and the low density fluid is air, the bubbles coming from the water will pass through the barrier into the air but air will not pass the other way. This feature is significant when the barrier is used for covering a body of deaerated water, such as is sometimes used for energy conversion, since the barrier would retard air from entering and aerating the water. Rain on the other hand will pass from the air through the barrier and into the water but water will not pass the other way.

The barrier may be used to retard the transfer of gas thereby reducing smell, fumes, evaporation and the risk of fire from combustable fumes. The barrier also may be used to prevent splash problems.

The barrier may retard or allow the transfer of various energies such as sunlight and other electromagnetic waves, be a conductor or insulator of heat, dampen the passage of sound and reduce wave motion. Preferably, the enclosed fluid within each coverite includes a low density enclosed fluid having a density approximately the same as the first said low density fluid and a high density enclosed fluid having a density approximately the same as the first said high density fluid.

In this embodiment the surface of the high density enclosed fluid will be at approximately the same level as the surface of the high density fluid on which the coverites float. As a result, the pressure inside the coverite and outside the coverite, at all elevations of the coverite, is approximately the same. This is an important feature since it tends to reduce leakage in or out of the coverite through the flexible wall, which in some cases could be very thin. In the solar heating embodiment described above, the low density enclosed fluid is air and the high density enclosed fluid is water.

It also is preferred that each coverite include means, such as an interior wall, for separating the low density enclosed fluid from the high density enclosed fluid. In this embodiment, the coverite tends to direct itself so that the low density enclosed fluid is oriented upwards and the high density enclosed fluid is oriented downwards.

Both the high density enclosed fluid and the low density enclosed fluid may be gasses. Such an embodiment would be applicable when a coverite blanket of balloon-like bags was used to cover an open container of a heavy gas.

Also, both the high density enclosed fluid and the low density enclosed fluid may be liquids. Such an embodiment would be applicable when a coverite blanket containing fresh water in one compartment and salt water in another compartment was used to separate fresh water from salt water.

In another embodiment, the wall of flexible material and/or the enclosed fluid are opaque to solar radiation. When this embodiment of the barrier is used to separate a body of water from the atmosphere, solar radiation is prevented from reaching the water, whereby the barrier retards algae and plant growth in the body of water and reduces the solar heating of the body of water, thereby conserving the water from evaporation.

In another embodiment, the enclosed fluid includes a sound dampening-foam. This embodiment of the barrier is useful when explosions are conducted underwater.

Liquids enclosed within the coverites may contain a substance which decreases convection within the enclosed liquids and thereby decreases heat loss by convention. A blanket of such coverites may be used to prevent water from freezing in winter.

Further objects and advantages of the invention will become apparent from a consideration of the drawings and the description of the preferred embodiment.

DESCRIPTION OF THE PREFERRED EMBODIMENT

A preferred embodiment of the barrier applicable for solar heating of water is described. In this embodiment the coverite wall material may be a polyolefine such as polyethylene or polypropylene.

Figure 1:
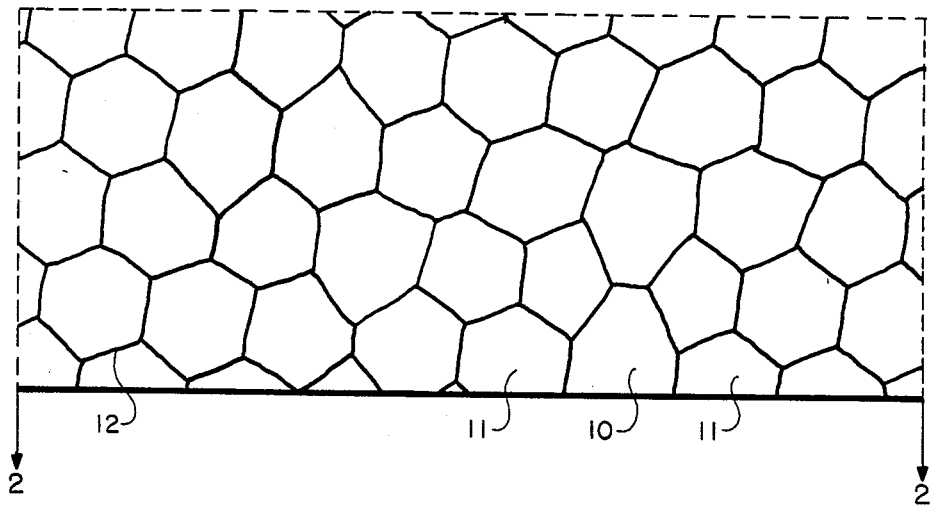
FIG. 1 shows a segment of a blanket of coverites of a preferred embodiment of the invention seen from above.
Figure 2:
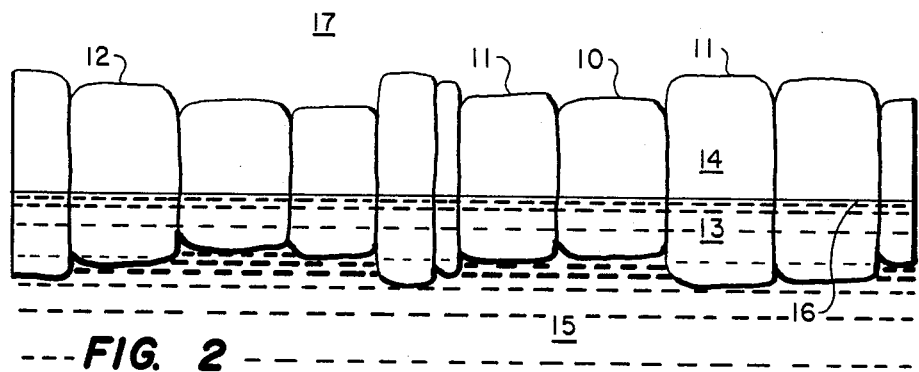
FIG. 2 is a sectional view of FIG. 1 taken through a plane indicated by section line 2—2 in FIG. 1 seen from the side.

FIGS. 1 and 2 show a segment of a blanket consisting of thousands of coverites 10 and 11 seen in FIG. 1 from above and seen in FIG. 2 from the side. Each coverite is a sealed bag with its wall 12 comprising a thin translucent film of polyethylene plastic which encases a translucent liquid of water 13 and a translucent gas of air 14. Each coverite 10 presses against and compresses its neighboring coverites 11 whereby its thin flexible wall 12 conforms to the shape of the contacting part of the neighboring coverites' thin flexible walls 12. Above the blanket of coverites 10 and 11 is air 17. The blanket of coverites 10 and 11 floats on a body of water 15. The surface of the body of water 15 and the surface 16 of the liquid of water 13 inside the coverites 10 and 11 are approximately at the same elevation. The liquid and the gas inside the coverite may be separated by a film of plastic at 16 to prevent condensation of liquid on the upper wall of the coverite.

The radiation from the sun, not shown, comes from above and passes through the blanket of coverites 10 and 11, since the gas of air 14 and the liquid of water 13 and the polyethylene plastic all are translucent. The radiation from the sun continues into the body of water 15 where it is converted into heat. Some of the radiation will strike the bottom of the water, not shown, which has a dark color and the radiation will here be converted to heat, which will be transferred to the body of water 15 by conduction and convection. The blanket of coverites 10 and 11 reduces heat loss from the heated water 15. The continuous blanket of coverites reduces heat absorbing evaporation from the body of water 15 to the air 17, and thermally insulates the body of water 15 from the air 17, since the gas of air 14 inside the coverites 10 and 11 is a good heat insulator. All warm bodies radiate away energy, also the heated body of water 15 which radiates a low frequency infrared light; but since the wall of polyethylene plastic 12 is opaque to radiation of this frequency, this energy is trapped and returned to the body of water 15. In fact, the coverites act as a heat trap reducing all four types of heat losses, namely conduction, convection, evaporation and infrared radiation. It is expected that the temperature would not be significantly reduced during the night when the water is more than one meter deep. It should be noted that substantial solar heating of water also will take place on a cloudy day.

In order to prevent algae and other biofouling organisms from growing on the coverite, it is possible to add small quantities of a chemical such as copper sulfate to the plastic. A surfactant may be added to the liquid in order to control condensation of vapor on the inside wall of the coverite and a substance may be added to the liquid of water in order to increase the viscosity of the liquid, in order to decrease convention in the liquid and thereby decrease heat loss by such convection.

For example the liquid may include a transparent polymeric gel, such as an acrylamide gel prepared by dissolving a high MW polyacrylic acid in water at a concentration of 0.1%. When the blanket is used in a salt-gradient solar pond, convection in the enclosed liquid may be decreased with a water having a vertical density gradient achieved with a dissolved salt.

I claim:

1. A barrier interposed between a body of high density fluid and a body of low density fluid for retarding transfer of energy and substances between said bodies of high and low density fluids, comprising a floating blanket consisting of a multitude of individual and distinct coverites disposed side by side to one another wherein each coverite floats on said body of high density fluid, and wherein said blanket separates said body of low density fluid from said body of high density fluid;

wherein each coverite of the blanket comprises a wall of flexible material encasing an enclosed fluid; and wherein each coverite presses against and compresses its neighboring coverites, whereby its flexible wall mutually conforms to the shape of its neighboring coverites' flexible walls to thereby form the floating blanket barrier.

2. A barrier according to claim 1, wherein the enclosed fluid comprises a low density enclosed fluid having a density approximately the same as the first said low density fluid and a high density enclosed fluid having a density approximately the same as the first said high density fluid.

3. A barrier according to claim 2, wherein each coverite includes means for separating the low density enclosed fluid from the high density enclosed fluid.

4. A barrier according to claim 2, wherein the high density enclosed fluid contains means for decreasing convection in the high density enclosed fluid.

5. A barrier according to claim 4, wherein the wall of flexible material and the enclosed fluids are transparent to at least a part of the solar radiation spectrum.

6. A barrier according to claim 4, wherein the convection decreasing means comprises water having a vertical density gradient achieved with a dissolved salt.

7. A barrier according to claim 4, wherein the convection decreasing means comprises a gel that is transparent to at least a part of the solar radiation spectrum.

8. A barrier according to claim 2, wherein both enclosed fluids are liquids.

9. A barrier according to claim 8, wherein both enclosed fluids contain means for decreasing convection in the enclosed fluids.

10. A barrier according to claim 9, wherein the convection decreasing means comprises water having a vertical density gradient achieved with a dissolved salt.

11. A barrier according to claim 9, wherein the convection decreasing means comprises a gel that is transparent to at least a part of the solar radiation spectrum.

12. A barrier according to claim 2, wherein both enclosed fluids are gases.

13. A barrier according to claim 1, wherein the wall of flexible material and the enclosed fluid are transparent to at least a part of the solar radiation spectrum.

14. A barrier according to claim 1, wherein the wall of flexible material and/or the enclosed fluid are opaque to the solar radiation spectrum.

15. A barrier according to claim 1, wherein the enclosed fluid comprises a sound-dampening foam.

* * * * *